(12) United States Patent
Hernden et al.

(10) Patent No.: US 12,253,140 B2
(45) Date of Patent: Mar. 18, 2025

(54) TEMPERATURE COMPENSATING VALVE FOR GAS SPRINGS

(71) Applicant: Suspa GmbH, Altdorf (DE)

(72) Inventors: Tyler S. Hernden, Grand Rapids, MI (US); Dennis R. Baker, Grand Rapids, MI (US); Ryan T. Anderson, Grand Rapids, MI (US); Kevin T. Braat, Grand Rapids, MI (US); D. Stuart Atwater, Grand Rapids, MI (US)

(73) Assignee: Suspa GmbH (DE)

(*) Notice: Subject to any disclaimer, the term of this patent is extended or adjusted under 35 U.S.C. 154(b) by 433 days.

(21) Appl. No.: 17/425,382

(22) PCT Filed: Jan. 29, 2020

(86) PCT No.: PCT/US2020/015616
§ 371 (c)(1),
(2) Date: Jul. 23, 2021

(87) PCT Pub. No.: WO2020/160107
PCT Pub. Date: Aug. 6, 2020

(65) Prior Publication Data
US 2022/0099155 A1    Mar. 31, 2022

Related U.S. Application Data (60) Provisional application No. 62/798,288, filed on Jan. 29, 2019.

(51) Int. Cl.
*F16F 9/34*    (2006.01)
*F16F 9/02*    (2006.01)
(Continued)

(52) U.S. Cl.
CPC ............ *F16F 9/526* (2013.01); *F16F 9/0218* (2013.01); *F16F 9/34* (2013.01); *F16K 31/002* (2013.01); *F16F 2222/126* (2013.01)

(58) Field of Classification Search
CPC .......... F16F 9/523; F16F 9/526; F16F 9/0218; F16F 9/34; F16F 2222/126; F16K 31/002
(Continued)

(56) References Cited

U.S. PATENT DOCUMENTS

| 3,995,842 A | 12/1976 | Freitag |
| 4,408,751 A | 10/1983 | Dodson et al. |

(Continued)

FOREIGN PATENT DOCUMENTS

| EP | 3358116 A1 | 8/2018 |
| JP | S57-33242 A | 2/1982 |

(Continued)

*Primary Examiner* — Christopher P Schwartz
(74) *Attorney, Agent, or Firm* — Price Heneveld LLP (57) ABSTRACT

A temperature compensating valve assembly is provided that includes a bimetallic spring that deforms from a closed position to an open position in response to temperature, and a single-piece valve body having an aperture therethrough and having an open end for receiving the bimetallic spring. The single-piece valve body includes integral retainers for retaining the bimetallic spring in the open end in a location such that the aperture is blocked by the bimetallic spring when in the closed position and is not blocked by the bimetallic spring when in the open position.

14 Claims, 10 Drawing Sheets

(51) Int. Cl.
*F16F 9/52* (2006.01)
*F16K 31/00* (2006.01)

(58) Field of Classification Search
USPC .......................... 188/276, 277, 279; 267/120
See application file for complete search history.

(56) References Cited

U.S. PATENT DOCUMENTS

| | | | |
|---|---|---|---|
| 5,106,065 A | 4/1992 | Staton et al. | |
| 6,378,682 B1* | 4/2002 | Mohan | F16D 48/04 |
| | | | 192/103 F |
| 6,802,791 B1* | 10/2004 | Yoshioka | F16K 17/0406 |
| | | | 475/249 |
| 6,959,921 B2 | 11/2005 | Rose | |
| 7,484,720 B2 | 2/2009 | Lange et al. | |
| 9,486,824 B2* | 11/2016 | Uschold | B05B 9/01 |
| 9,593,737 B2 | 3/2017 | Colombo et al. | |
| 2005/0051216 A1* | 3/2005 | Sato | F02M 25/0836 |
| | | | 137/493.6 |
| 2006/0249211 A1* | 11/2006 | Tooke | F16K 31/025 |
| | | | 137/883 |
| 2022/0349453 A1* | 11/2022 | Burrell | F16F 9/523 |

FOREIGN PATENT DOCUMENTS

| | | |
|---|---|---|
| KR | 10-1538020 B1 | 7/2015 |
| WO | 2006/086207 A2 † | 8/2006 |

\* cited by examiner
† cited by third party

TEMPERATURE COMPENSATING VALVE FOR GAS SPRINGS

FIELD OF THE INVENTION

The present invention generally relates to temperature compensating valves used in gas springs, and more particularly, temperature compensating valves used in gas springs for vehicles.

SUMMARY OF THE INVENTION

According to one aspect of the present invention, a temperature compensating valve assembly is provided comprising a bimetallic spring that deforms from a closed position to an open position in response to temperature; and a single-piece valve body having an aperture therethrough and having an open end for receiving the bimetallic spring, the single-piece valve body comprising integral retainers for retaining the bimetallic spring in the open end in a location such that the aperture is blocked by the bimetallic spring when in the closed position and is not blocked by the bimetallic spring when in the open position.

According to another aspect of the present invention, a temperature compensating valve assembly is provided comprising a bimetallic spring that deforms from a closed position to an open position in response to temperature, the bimetallic spring includes a first side and a second side opposite the first side; and a single-piece valve body having an aperture therethrough and having an open end for receiving the bimetallic spring. The single-piece valve body further comprises: a cylindrical rim extending axially around the open end; a support surface within the open end, the support surface extending radially inward from the cylindrical rim and recessed from the cylindrical rim, the first side of the bimetallic spring is supported in the open end on the support surface; and resilient retaining snaps extending inward from the cylindrical rim for retaining the bimetallic spring in the open end in a location such that the aperture is blocked by the bimetallic spring when in the closed position and is not blocked by the bimetallic spring when in the open position, the resilient retaining snaps configured to move radially outward as the bimetallic spring is pressed into the open end and to snap radially inward to engage and retain the second side of the bimetallic spring when the first side contacts the support surface.

According to another aspect of the present invention, a temperature compensating valve assembly is provided comprising a bimetallic spring that deforms from a closed position to an open position in response to temperature, the bimetallic spring includes a first side and a second side opposite the first side; and a single-piece valve body having an aperture therethrough and having an open end for receiving the bimetallic spring, the single-piece valve body comprising integral heat stakes extending from inside the open end for retaining the bimetallic spring in the open end in a location such that the aperture is blocked by the bimetallic spring when in the closed position and is not blocked by the bimetallic spring when in the open position. The single-piece valve body further comprises: a cylindrical rim extending axially around the open end; and a support surface within the open end, the support surface extending radially inward from the cylindrical rim and recessed from the cylindrical rim, the first side of the bimetallic spring is supported in the open end on the support surface, wherein the integral heat stakes are melted after the bimetallic spring is placed inside the open end to deform and thereby retain the bimetallic spring between the support surface and the heat stakes.

According to another aspect of the present invention, a gas spring assembly is provided comprising a gas cylinder having a cylindrical chamber; and a temperature compensating valve comprising: a bimetallic spring that deforms from a closed position to an open position in response to temperature; and a single-piece valve body having an aperture therethrough and having an open end for receiving the bimetallic spring, the single-piece valve body comprising integral retainers for retaining the bimetallic spring in the open end in a location such that the aperture is blocked by the bimetallic spring when in the closed position and is not blocked by the bimetallic spring when in the open position, wherein the single-piece valve body is positioned within the cylindrical chamber.

According to another aspect of the present invention, a temperature compensating valve assembly is provided comprising a bimetallic spring that deforms from a closed position to an open position in response to temperature, the bimetallic spring includes a first side and a second side opposite the first side; a valve body having an aperture therethrough and having an open end for receiving the bimetallic spring; and a cap placed inside the open end of the valve body for retaining the bimetallic spring in the open end in a location such that the aperture is blocked by the bimetallic spring when in the closed position and is not blocked by the bimetallic spring when in the open position, wherein the cap is ultrasonically welded to the valve body.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION OF THE EMBODIMENTS

The present illustrated embodiments reside primarily in combinations of apparatus components related to a temperature compensating valve assembly and a gas spring assembly including the temperature compensating valve assembly. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
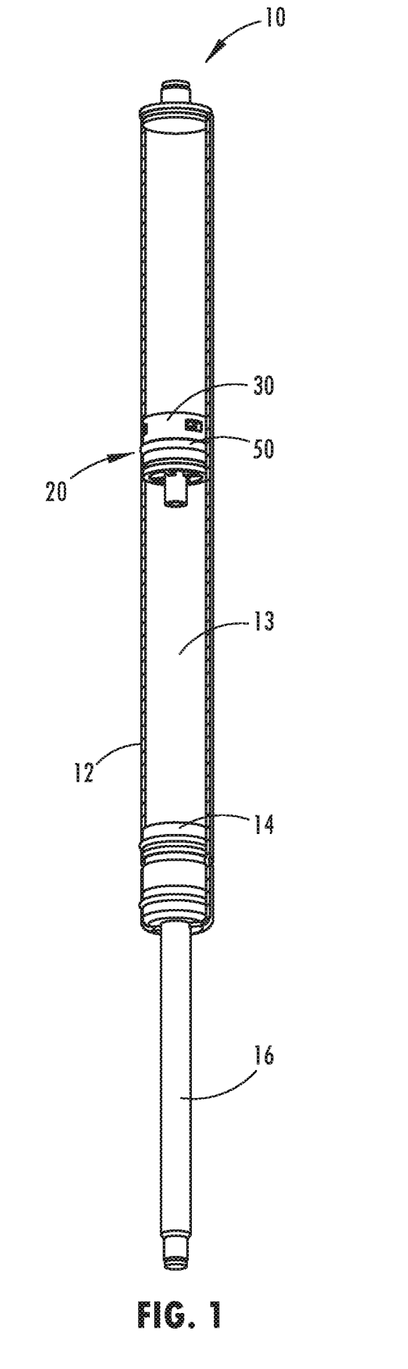
FIG. 1 is a partial cross-sectional perspective view of a gas spring assembly in the extended position.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
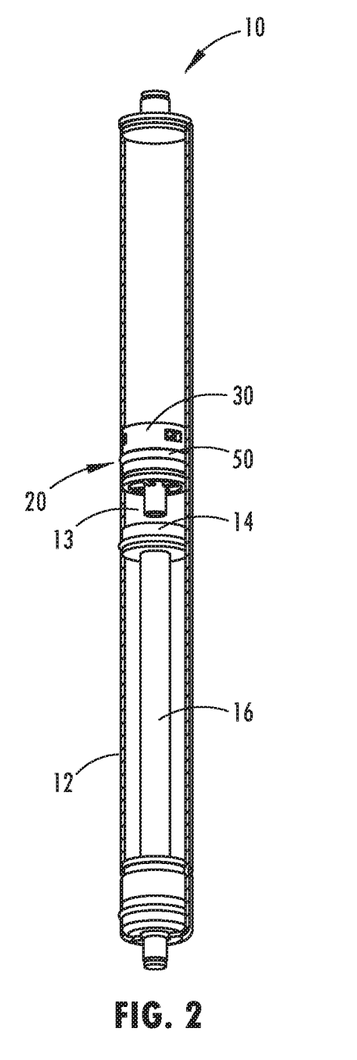
FIG. 2 is a partial cross-sectional perspective view of the gas spring assembly of FIG. 1 in the contracted position.
Figure 3:
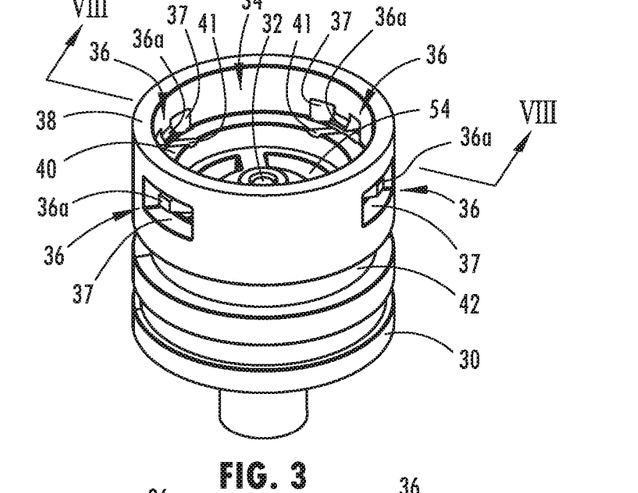
FIG. 3 is a perspective view of a single-piece valve body that may be used in the gas spring assembly of FIGS. 1 and 2.
Figure 4:
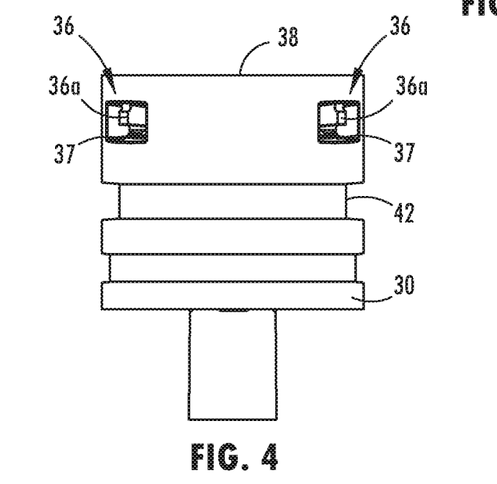
FIG. 4 is a front elevational view of the single-piece valve body of FIG. 3.
Figure 5:
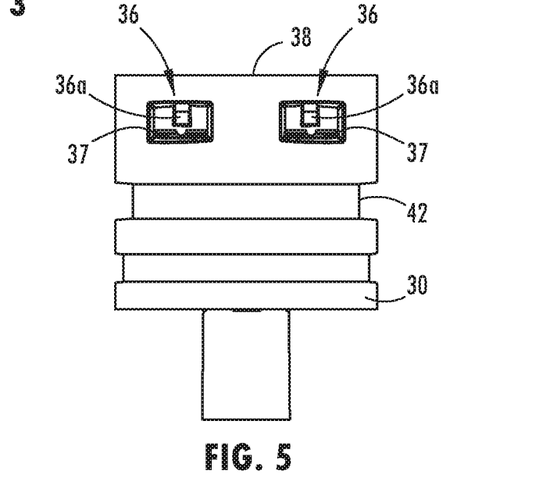
FIG. 5 is a side elevational view of the single-piece valve body of FIG. 3.
Figure 6:
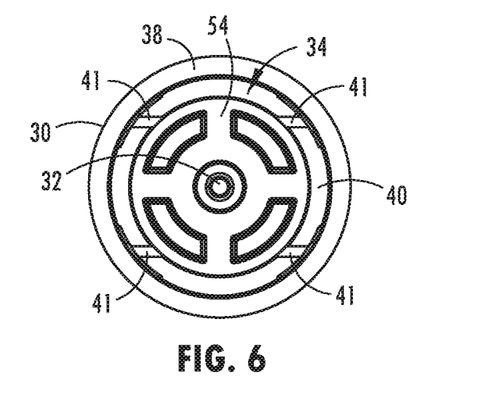
FIG. 6 is a plan view of a top of the single-piece valve body of FIG. 3.
Figure 7:
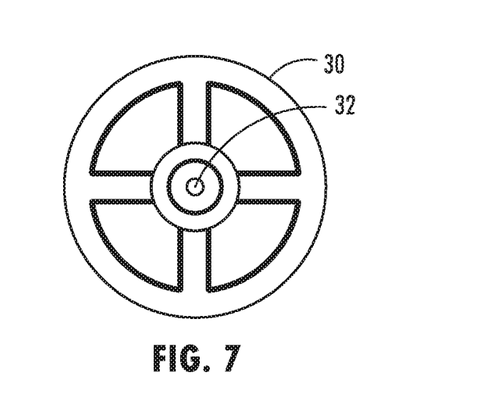
FIG. 7 is a plan view of a bottom of the single-piece valve body of FIG. 3.

Referring to FIGS. 1 and 2, reference numeral 10 generally designates a gas spring. The gas spring assembly 10 may be used for dampening the closing of a rear hatch door on vehicles so the door will not slam shut. Although this particular application of the gas spring assembly 10 is described herein, the gas spring assembly 10 may be used in various other applications so the description of the dampening of a rear hatch door of a vehicle is not intended to be limiting.

In general, the gas spring assembly 10 includes a gas cylinder 12 having a cylindrical chamber 13 and a piston 14 that moves within the cylindrical chamber 13. The piston 14 is attached to a rod 16 that pushes the piston 14 further into the cylindrical chamber 13 upon closing of the door and pulls the piston 14 upon opening the door. FIG. 1 shows the rod 16 and piston 14 in a fully extended position and FIG. 2 shows the rod 16 and piston 14 in a fully compressed position. As the piston 14 is pushed further into the cylindrical chamber 13, the pressure of the gas within the cylindrical chamber 13 builds and causes resistance. A valve assembly 20 may be provided in the cylindrical chamber 13 to slowly release the pressure to allow the door to close. Because the pressure in the cylindrical chamber 13 will vary with different ambient temperatures, the valve assembly 20 may be a temperature compensating valve assembly as described below in order to change the rate at which gas is allowed to be released depending on the ambient temperature.

Figure 11:
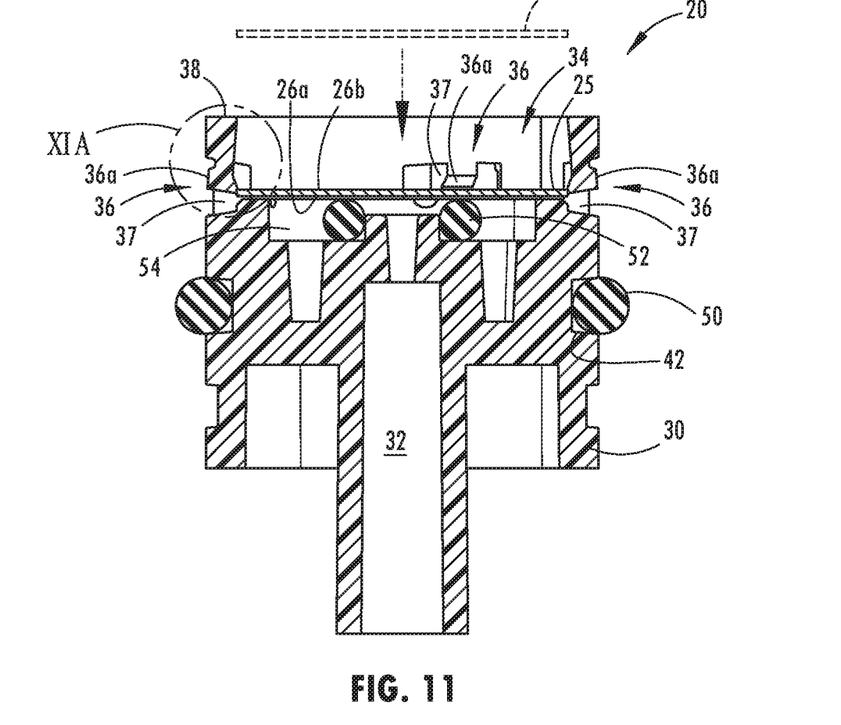
FIG. 11 is a cross-sectional view of the temperature compensating valve assembly of FIGS. 9 and 10 showing the insertion of a bimetallic spring into the single-piece valve body.
Figure 11A:
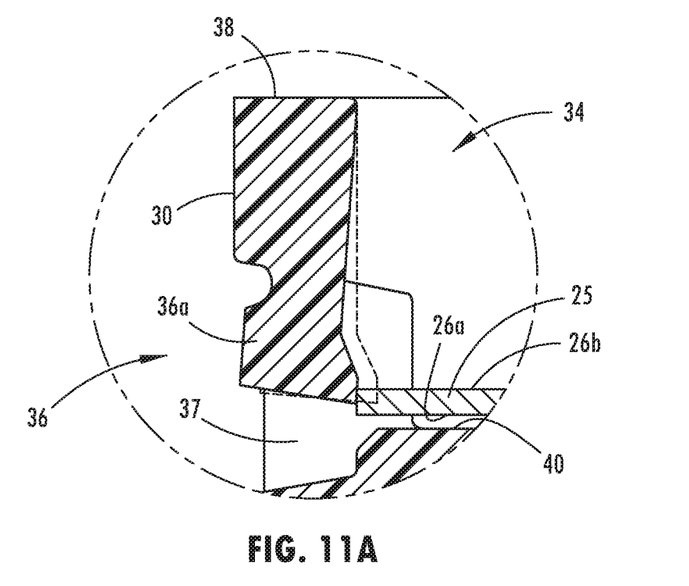
FIG. 11A is an enlarged cross-sectional view of the area XIA in FIG. 11.

Three embodiments of the temperature compensating valve assembly 20 are described below and are shown in FIGS. 3-16. Each of the embodiments includes a bimetallic spring 25 that deforms from a closed position to an open position in response to the ambient temperature reaching a deformation temperature of a metal from which the bimetallic spring 25 is made. If the ambient temperature falls back below the deformation temperature, the bimetallic spring flattens back into the closed position to block airflow. The first and second embodiments include a single-piece valve body 30 having an aperture 32 therethrough and having an open end 34 for receiving the bimetallic spring 25. The single-piece valve body 30 includes integral retainers 36 for retaining the bimetallic spring 25 in the open end 34 in a location such that the aperture 32 is blocked by the bimetallic spring 25 when in the closed position and is not blocked by the bimetallic spring 25 when in the open position. The single-piece valve body 30 may further include a cylindrical rim 38 extending axially around the open end 34, and a support surface 40 within the open end 34. The support surface 40 may extend radially inward from the cylindrical rim 38 and be recessed from the cylindrical rim 38. The bimetallic spring 25 includes a first side 26a and a second side 26b opposite the first side 26a. The first side 26a of the bimetallic spring 25 is supported in the open end 34 on the support surface 40. As shown in FIGS. 1 and 2, the outer dimensions of the single-piece valve body 30 are slightly less than the inner dimensions of the cylindrical chamber 13 of the gas spring assembly 10. A first O-ring 50 may be provided within a groove 42 formed around the periphery of the single-piece valve body 30 so as to form a seal between the inner walls of the cylindrical chamber 13 and the single-piece valve body 30. As best shown in FIG. 11, a second O-ring 52 may be provided in a recess 54 formed in the support surface 40 for providing a seal between the single-piece valve body 30 and the bimetallic spring 25 when the bimetallic spring 25 is in the closed position.

The single-piece valve body 30 is an integrally formed element that may be made by molding a plastic. The single-piece valve body 30 is advantageous in that it does not require multiple components or any assembly. By using the single-piece valve body 30, the temperature compensating valve assembly 20 may be constructed with as few as four components: the single-piece valve body 30, the bimetallic spring 25, and the first and second O-rings 50 and 52.

The bimetallic spring 25 is pressed against the second O-ring 52 when ambient temperatures are cold thereby closing the aperture 32. However, when the ambient temperatures are warm, the bimetallic spring 25 flexes away from the second O-ring 52 thereby opening the valve 20 such that gas may be released through the valve 20 from one side of the cylindrical chamber 13 to the other side. Further details of the temperature compensating valve assembly 20 are discussed below with respect to the first and second embodiments. In the first and second embodiments, the integral retainers 36 take different forms. In both of the first and second embodiments, however, the retainers 36 are integrally formed as part of the single-piece valve body 30.

Figure 8:
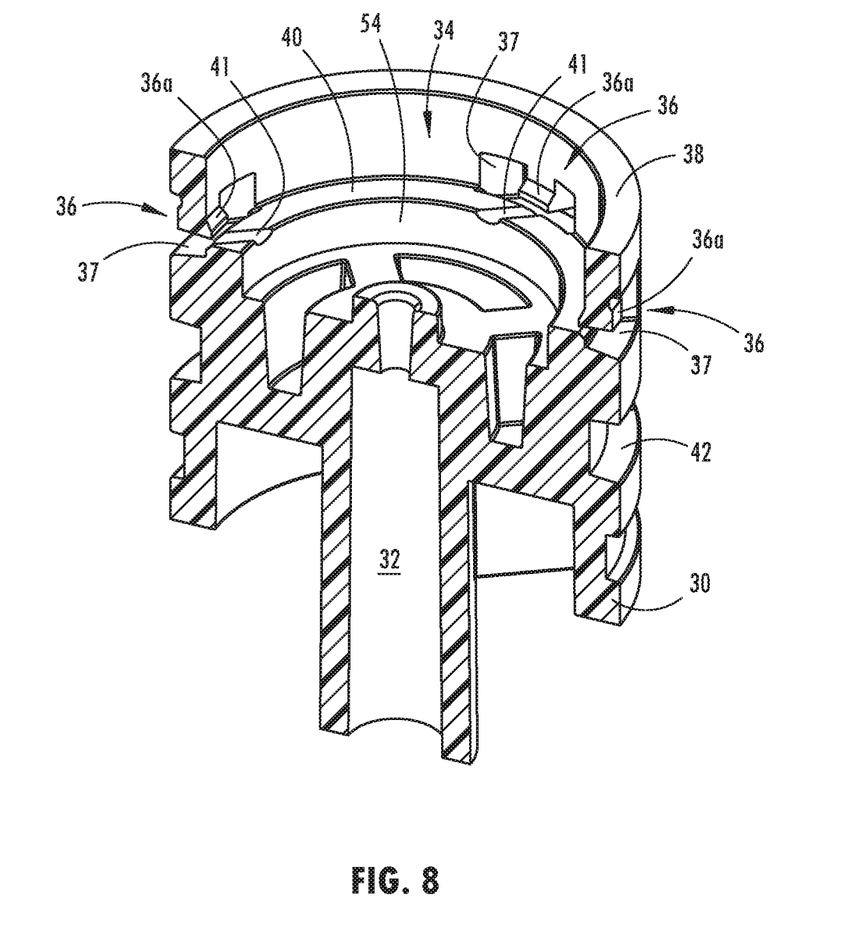
FIG. 8 is a cross-sectional perspective view of the single-piece valve body taken along line VIII-VIII in FIG. 3.
Figure 9:
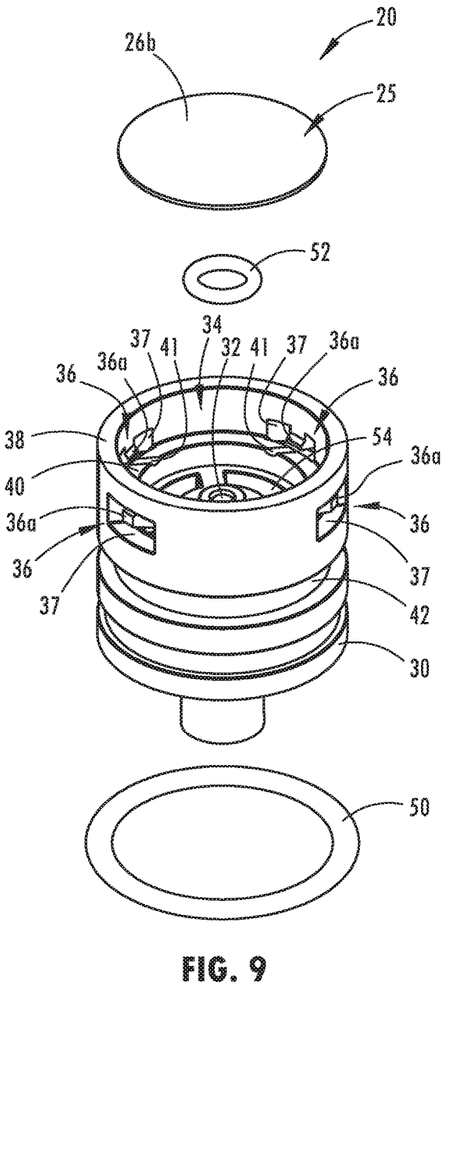
FIG. 9 is an exploded perspective view of a temperature compensating valve assembly that may be used in the gas spring assembly of FIGS. 1 and 2 and that uses the single-piece valve body of FIG. 3.
Figure 10:
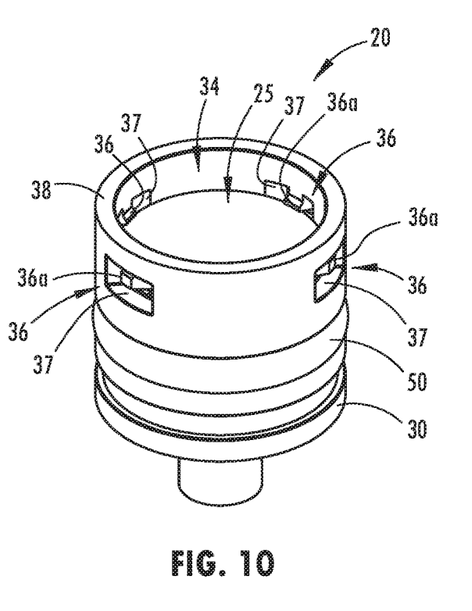
FIG. 10 is a perspective view of an assembled temperature compensating valve assembly that may be used in the gas spring assembly of FIGS. 1 and 2 and that uses the single-piece valve body of FIG. 3.
Figure 12:
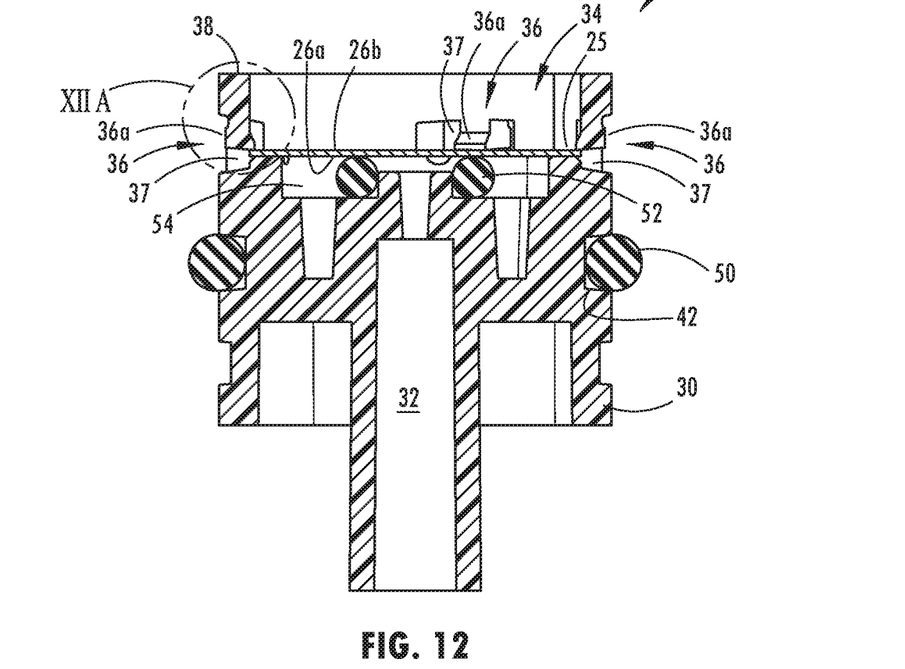
FIG. 12 is a cross-sectional view of the temperature compensating valve assembly of FIGS. 9 and 10 showing the full insertion of the bimetallic spring into the single-piece valve body.
Figure 12A:
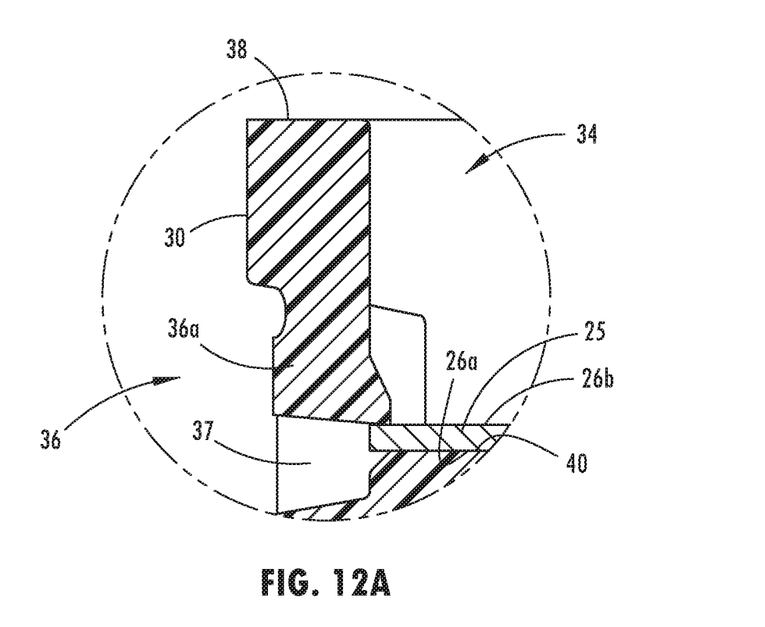
FIG. 12A is an enlarged cross-sectional view of the area XIIA in FIG. 12.
Figure 13:
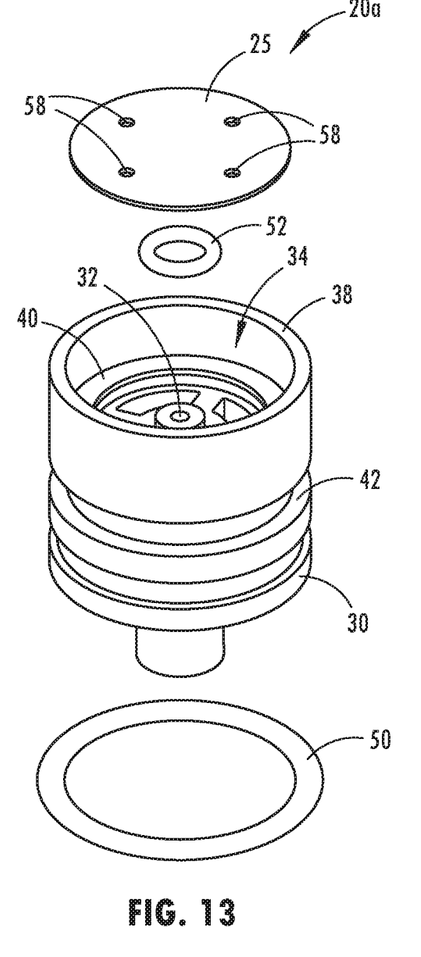
FIG. 13 is an exploded perspective view of an unassembled temperature compensating valve assembly according to a second embodiment that may be used in the gas spring assembly of FIGS. 1 and 2.
Figure 14:
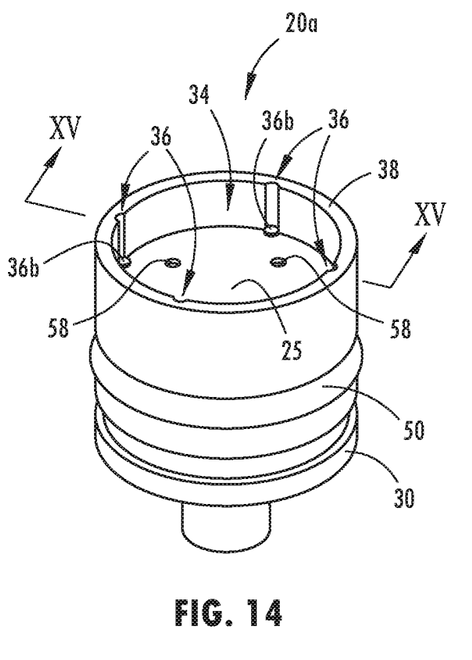
FIG. 14 is a perspective view of an assembled temperature compensating valve assembly according to the second embodiment shown in FIG. 13.
Figure 15:
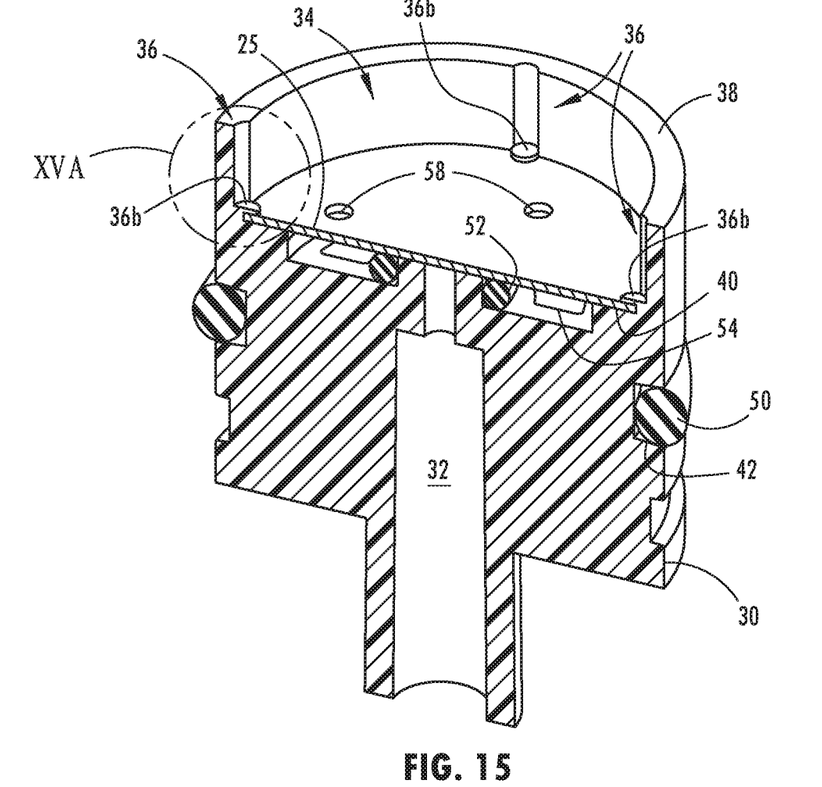
FIG. 15 is a cross-sectional view of perspective view of the valve assembly taken along line XV-XV in FIG. 14.
Figure 15A:
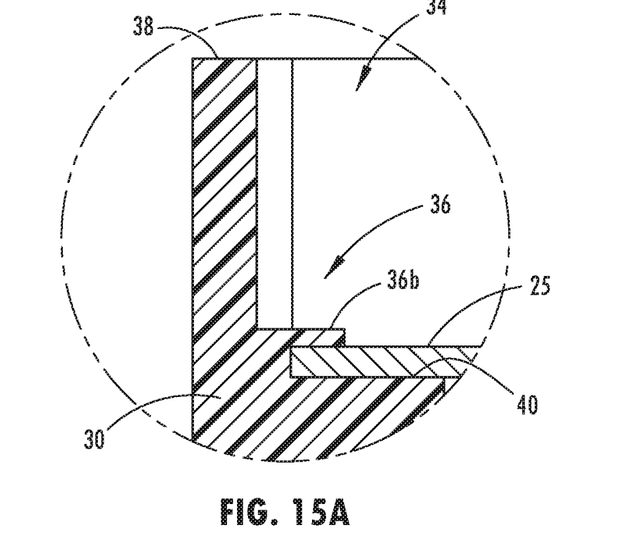
FIG. 15A is an enlarged cross-sectional view of the area XVA in FIG. 15.

The first embodiment of the temperature compensating valve assembly 20 is shown in FIGS. 3-12A. In the first embodiment, the integral retainers 36 include resilient retaining snaps 36a extending inward from the cylindrical rim 38. The resilient retaining snaps 36a are configured to move radially outward as the bimetallic spring 25 is pressed into the open end 34 (FIG. 11A) and to snap radially inward to engage and retain the second side 26b of the bimetallic spring 25 when the first side 26a contacts the support surface 40 (FIG. 12A). As best shown in FIGS. 5, 8, 11A, and 12A, each of the resilient retaining snaps 36a may extend downward from within a respective opening 37 in the side of the cylindrical rim 38 to provide a "living hinge." The resilient retaining snaps 36a allow for easy installation of the bimetallic spring 25 into the temperature compensating valve assembly 20. As shown in FIG. 8, a plurality of channels 41 may be provided within support surface 40 so as to provide passages for gas to escape under the bimetallic spring 25 when in the open position. Additionally or alternatively, one or more holes may be formed in the bimetallic spring 25 near its perimeter.

The second embodiment of the temperature compensating valve assembly 20a is shown in FIGS. 13-15A. In the second embodiment, the integral retainers 36 include heat stakes 36b formed from inside the open end 34. The bimetallic spring 25 is first placed in the open end 34 and then heated pins are pressed against the inside surface of the cylindrical rim 38 to melt the plastic in the regions where the heated pins contact the inside surface. The plastic then flows down onto the top surface of the bimetallic spring 25 and subsequently hardens to form the heat stakes 36b. The heat stakes 36b are thus integral retainers that retain the bimetallic spring 25. Aside from the difference in the integral retainers 36, the rest of the structure may remain the same as in the first embodiment. Note that one or more small holes 58 may be provided in the bimetallic spring 25 to allow air to flow through the valve when in the open position.

Figure 16:
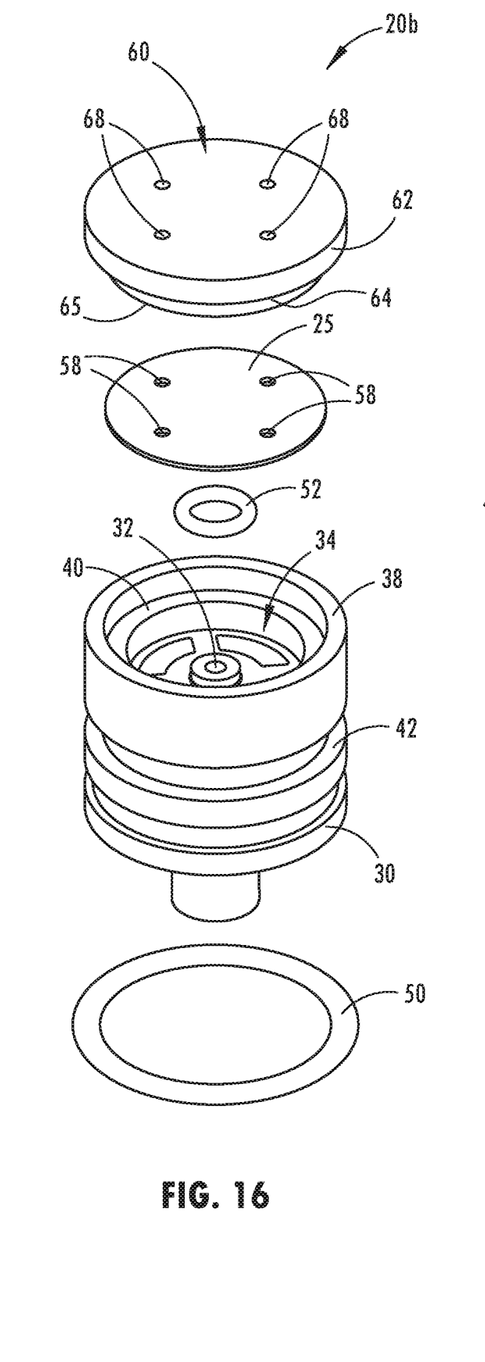
FIG. 16 is an exploded perspective view of an unassembled temperature compensating valve assembly according to a third embodiment that may be used in the gas spring assembly of FIGS. 1 and 2.
Figure 16A:
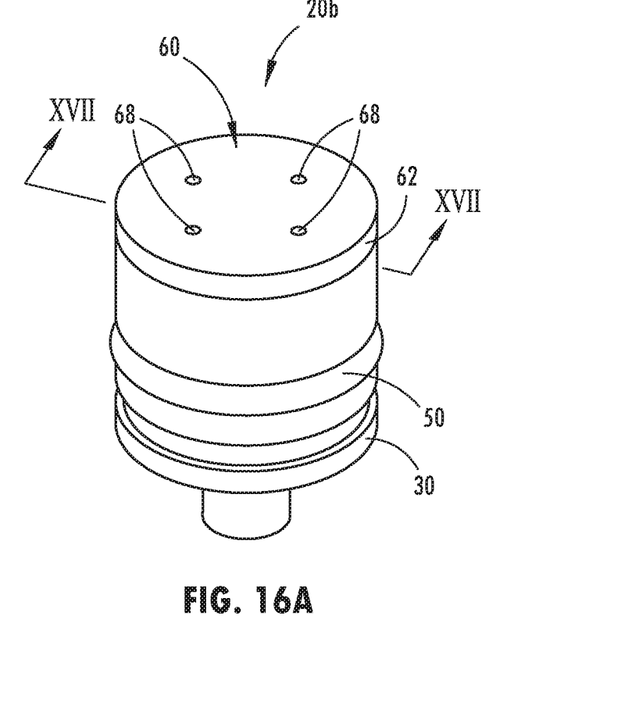
FIG. 16A is a perspective view of an assembled temperature compensating valve assembly according to the third embodiment shown in FIG. 16.
Figure 17:
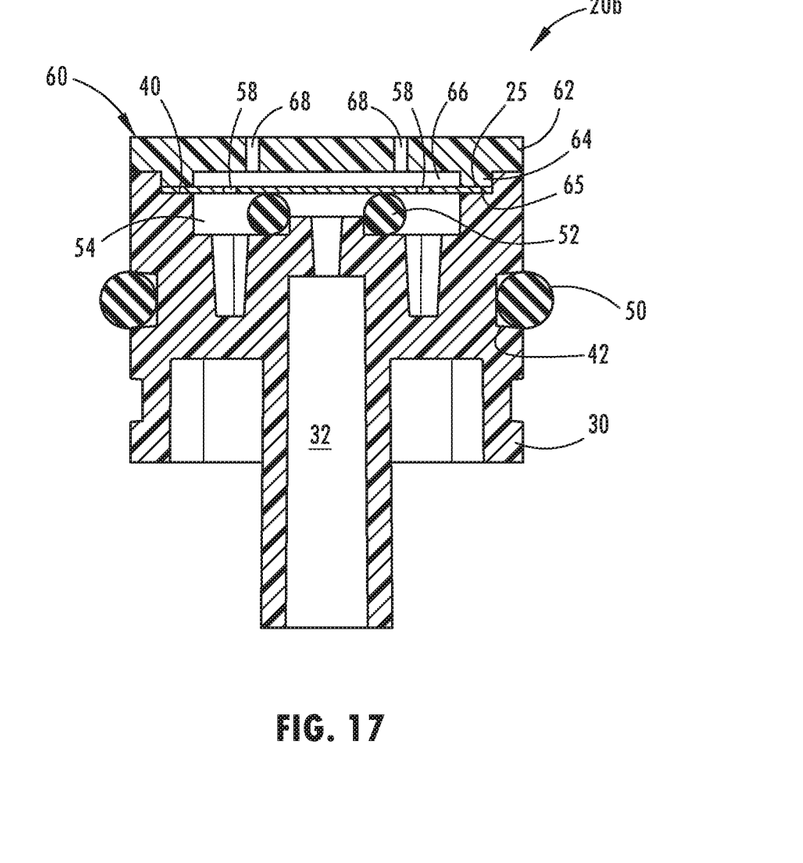
FIG. 17 is a cross-sectional view of perspective view of the valve assembly taken along line XVII-XVII in FIG. 16A.

The third embodiment of the temperature compensating valve assembly 20b is shown in FIGS. 16 and 17. In the third embodiment, the temperature compensating valve assembly 20b includes a bimetallic spring 25 that deforms from a closed position to an open position in response to temperature. The bimetallic spring 25 includes a first side and a second side opposite the first side. The valve assembly 20b may further include a valve body 30 having an aperture 32 therethrough and having an open end 34 for receiving the bimetallic spring 25. The valve assembly 20b may further include a cap 60 placed inside the open end 34 of the valve body 30 for retaining the bimetallic spring 25 in the open end 34 in a location such that the aperture 32 is blocked by the bimetallic spring 25 when in the closed position and is not blocked by the bimetallic spring 25 when in the open position. The cap 60 is ultrasonically welded to the valve body 30.

The valve body 30 may include a cylindrical rim 38 extending axially around the open end 34, and a support surface 40 within the open end 34. The support surface 40 extends radially inward from the cylindrical rim 38 and recessed from the cylindrical rim 38. The first side of the bimetallic spring 25 is supported in the open end 34 on the support surface 40.

The cap 60 includes a top 62 and an inner cylindrical portion 64 extending downward from the top 62. The top 62 has an outer dimension corresponding to the outer dimension of the valve body 30. The inner cylindrical portion 64 has an outer dimension corresponding to an inner dimension of the cylindrical rim 38 of the valve body 30.

A lower end 65 of the inner cylindrical portion 64 is configured to press the bimetallic spring 25 against the support surface 40 around a periphery thereof and a hollow portion 66 to allow the bimetallic spring 25 to flex upward to not block the aperture 32 in an open position.

The cap 60 may have at least one aperture 68 for allowing fluid communication through the valve assembly 20b when the aperture 32 is not blocked by the bimetallic spring 25 in the open position. An outer dimension of the valve body 30 may correspond to inner dimensions of a gas spring cylinder 10.

For purposes of this disclosure, the term "integral" (in all of its forms, integrally, integrated, etc.) generally means formed as a single unitary body rather than two separately formed elements that are subsequently joined together.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited. For example, the length or width of the structures and/or members or other elements of the assembly may be varied. It should be noted that the elements and/or assemblies of the assembly may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A temperature compensating valve assembly comprising:
   a bimetallic spring that deforms from a closed position to an open position in response to temperature, the bimetallic spring includes a first side and a second side opposite the first side;
   a valve body having a first aperture therethrough and comprising:
      an open end for receiving the bimetallic spring,
      a cylindrical rim extending axially around the open end, and
      a support surface within the open end, the support surface extending radially inward from the cylindrical rim and recessed from the cylindrical rim, the first side of the bimetallic spring is supported in the open end on the support surface; and
   a cap placed inside the open end of the valve body for retaining the bimetallic spring in the open end in a location such that the first aperture is blocked by the bimetallic spring when in the closed position and is not blocked by the bimetallic spring when in the open position,
   wherein the cap is ultrasonically welded to the valve body,
   wherein the cap includes a top and an inner cylindrical portion extending downward from the top, the top having an outer dimension corresponding to the outer dimension of the valve body, the inner cylindrical portion having an outer dimension corresponding to an inner dimension of the cylindrical rim of the valve body.

2. The valve assembly of claim 1, wherein a lower end of the inner cylindrical portion is configured to press the bimetallic spring against the support surface around a periphery thereof and to allow the bimetallic spring to flex upward to not block the first aperture in an open position.

3. The valve assembly of claim 1, wherein the cap has at least one second aperture for allowing fluid communication through the valve assembly when the first aperture is not blocked by the bimetallic spring in the open position.

4. The valve assembly of claim 1 wherein an outer dimension of the valve body corresponds to inner dimensions of a gas spring cylinder.

5. A temperature compensating valve assembly comprising:
   a bimetallic spring that deforms from a closed position to an open position in response to temperature; and
   a single-piece valve body having an aperture therethrough and having an open end for receiving the bimetallic spring, the single-piece valve body comprising integral retainers for retaining the bimetallic spring in the open end in a location such that the aperture is blocked by the bimetallic spring when in the closed position and is not blocked by the bimetallic spring when in the open position, wherein the single-piece valve body further comprises:
   a cylindrical rim extending axially around the open end; and
   a support surface within the open end, the support surface extending radially inward from the cylindrical rim and recessed from the cylindrical rim,
   wherein the bimetallic spring includes a first side and a second side opposite the first side, the first side of the bimetallic spring is supported in the open end on the support surface,
   wherein:
      the integral retainers include heat stakes, and
      the heat stakes are melted to deform and retain the bimetallic spring.

6. The valve assembly of claim 5, wherein the bimetallic spring does not block the aperture when the ambient temperature reaches a deformation temperature of a metal material from which the bimetallic spring is made, and blocks the aperture when an ambient temperature falls below the deformation temperature.

7. The valve assembly of claim 5, wherein the outer dimensions of the single-piece valve body correspond to inner dimensions of a gas spring cylinder.

8. A temperature compensating valve assembly comprising:
   a bimetallic spring that deforms from a closed position to an open position in response to temperature, the bimetallic spring includes a first side and a second side opposite the first side; and
   a single-piece valve body having an aperture therethrough and having an open end for receiving the bimetallic spring, wherein the single-piece valve body further comprises:
      a cylindrical rim extending axially around the open end;
      a support surface within the open end, the support surface extending radially inward from the cylindrical rim and recessed from the cylindrical rim, the first side of the bimetallic spring is supported in the open end on the support surface; and
      resilient retaining snaps extending inward from the cylindrical rim for retaining the bimetallic spring in the open end in a location such that the aperture is blocked by the bimetallic spring when in the closed position and is not blocked by the bimetallic spring when in the open position, the resilient retaining snaps configured to move radially outward as the bimetallic spring is pressed into the open end and to snap radially inward to engage and retain the second side of the bimetallic spring when the first side contacts the support surface.

9. The valve assembly of claim 8, wherein the outer dimensions of the single-piece valve body correspond to the inner dimensions of a gas spring cylinder.

10. A gas spring assembly comprising:
    a gas cylinder having a cylindrical chamber; and
    a temperature compensating valve comprising:
       a bimetallic spring that deforms from a closed position to an open position in response to temperature; and
       a single-piece valve body having an aperture therethrough and having an open end for receiving the bimetallic spring, the single-piece valve body comprising integral retainers for retaining the bimetallic spring in the open end in a location such that the aperture is blocked by the bimetallic spring when in the closed position and is not blocked by the bimetallic spring when in the open position,
    wherein the single-piece valve body is positioned within the cylindrical chamber,
    wherein the single-piece valve body further comprises:
       a cylindrical rim extending axially around the open end; and
       a support surface within the open end, the support surface extending radially inward from the cylindrical rim and recessed from the cylindrical rim, wherein the bimetallic spring includes a first side and a second side opposite the first side, the first side of the bimetallic spring is supported in the open end on the support surface, and wherein:

the integral retainers include heat stakes, and the heat stakes are melted to deform and retain the bimetallic spring.

11. The gas spring assembly of claim 10, wherein the bimetallic spring does not block the aperture when the ambient temperature reaches a deformation temperature of a metal material from which the bimetallic spring is made, and blocks the aperture when an ambient temperature falls below the deformation temperature.

12. A temperature compensating valve assembly comprising:

a bimetallic spring that deforms from a closed position to an open position in response to temperature; and a single-piece valve body having an aperture therethrough and having an open end for receiving the bimetallic spring, the single-piece valve body comprising integral retainers for retaining the bimetallic spring in the open end in a location such that the aperture is blocked by the bimetallic spring when in the closed position and is not blocked by the bimetallic spring when in the open position, wherein the single-piece valve body further comprises:

a cylindrical rim extending axially around the open end; and a support surface within the open end, the support surface extending radially inward from the cylindrical rim and recessed from the cylindrical rim, wherein the bimetallic spring includes a first side and a second side opposite the first side, the first side of the bimetallic spring is supported in the open end on the support surface, wherein the integral retainers include resilient retaining snaps extending inward from the cylindrical rim, the resilient retaining snaps configured to move radially outward as the bimetallic spring is pressed into the open end and to snap radially inward to engage and retain the second side of the bimetallic spring when the first side contacts the support surface.

13. A temperature compensating valve assembly comprising:

a bimetallic spring that deforms from a closed position to an open position in response to temperature, the bimetallic spring includes a first side and a second side opposite the first side; and a single-piece valve body having an aperture therethrough and having an open end for receiving the bimetallic spring, the single-piece valve body comprising integral heat stakes extending from inside the open end for retaining the bimetallic spring in the open end in a location such that the aperture is blocked by the bimetallic spring when in the closed position and is not blocked by the bimetallic spring when in the open position, wherein the single-piece valve body further comprises:

a cylindrical rim extending axially around the open end; and a support surface within the open end, the support surface extending radially inward from the cylindrical rim and recessed from the cylindrical rim, the first side of the bimetallic spring is supported in the open end on the support surface, wherein the integral heat stakes are melted after the bimetallic spring is placed inside the open end to deform and thereby retain the bimetallic spring between the support surface and the heat stakes.

14. A gas spring assembly comprising:

a gas cylinder having a cylindrical chamber; and a temperature compensating valve comprising:

a bimetallic spring that deforms from a closed position to an open position in response to temperature; and a single-piece valve body having an aperture therethrough and having an open end for receiving the bimetallic spring, the single-piece valve body comprising integral retainers for retaining the bimetallic spring in the open end in a location such that the aperture is blocked by the bimetallic spring when in the closed position and is not blocked by the bimetallic spring when in the open position, wherein the single-piece valve body is positioned within the cylindrical chamber, wherein the single-piece valve body further comprises:

a cylindrical rim extending axially around the open end; and a support surface within the open end, the support surface extending radially inward from the cylindrical rim and recessed from the cylindrical rim, wherein the bimetallic spring includes a first side and a second side opposite the first side, the first side of the bimetallic spring is supported in the open end on the support surface, wherein the single-piece valve body is positioned within the cylindrical chamber, and wherein the integral retainers include resilient retaining snaps extending inward from the cylindrical rim, the resilient retaining snaps configured to move radially outward as the bimetallic spring is pressed into the open end and to snap radially inward to engage and retain the second side of the bimetallic spring when the first side contacts the support surface.

* * * * *